United States Patent [19]

Vink

[11] 3,828,661

[45] Aug. 13, 1974

[54] APPARATUS FOR THE PRODUCTION OF FOOD PELLETS FROM A FLOUR PRODUCT

[75] Inventor: Johannes Albertus Vink, Breukelen, Netherlands

[73] Assignee: CPM/Europe N.V., Amsterdam, Netherlands

[22] Filed: Aug. 25, 1972

[21] Appl. No.: 283,814

[30] Foreign Application Priority Data
Sept. 3, 1971  Netherlands .................... 7112111

[52] U.S. Cl. .................. 99/483, 99/485, 99/534, 259/6, 259/69, 425/200, 425/376
[51] Int. Cl. ............................................. A23k 1/20
[58] Field of Search .................. 259/6, 64, 68, 69; 100/DIG. 4, 73, 74, 75; 425/376, 200, 365; 99/483, 494, 485, 487, 516, 534, 471

[56] References Cited
UNITED STATES PATENTS

| | | | |
|---|---|---|---|
| 1,419,397 | 6/1922 | Marsh | 259/68 |
| 1,420,008 | 6/1922 | Wikel et al. | 99/534 X |
| 1,877,266 | 9/1932 | Chapin et al. | 99/483 X |
| 2,302,526 | 11/1942 | Card | 99/534 X |
| 2,710,744 | 6/1955 | Hensler | 259/6 X |
| 3,181,482 | 5/1965 | Heth et al. | 99/534 X |
| 3,345,442 | 10/1967 | Oxel | 259/6 X |

FOREIGN PATENTS OR APPLICATIONS

| | | | |
|---|---|---|---|
| 857,272 | 12/1970 | Canada | 100/DIG. 4 |

*Primary Examiner*—Billy J. Wilhite
*Attorney, Agent, or Firm*—Bruce & McCoy

[57] ABSTRACT

Apparatus for the production of food pellets from a flour product comprising a feeding section, a conditioning section for blending the flour product with additives and for heating and moistening the mixture, and a press section for pressing out the prepared flour product into pellets. The conditioning section includes two separate parallel adjacently and substantially horizontally disposed identical conditioning chambers each with a mixing and conveying means, both conditioning chambers having one common inlet duct connected to the feeding section arranged immediately thereabove and having one common outlet duct connected to the press section arranged immediately therebelow whereby the stream of flour flowing from the feeding section to the press section is, in the intermediate conditioning section, divided into two parallel product streams allowing a more effective processing of the flour passing through said chambers.

7 Claims, 5 Drawing Figures

3,828,661

APPARATUS FOR THE PRODUCTION OF FOOD PELLETS FROM A FLOUR PRODUCT

BACKGROUND OF THE INVENTION

The invention relates to the production of food pellets and more particularly to apparatus for the production of food pellets, especially animal food pellets, from a flour product. In making such pellets, a flour product, comprising one or a plurality of different grades and kinds of flour, is blended with suitable additives, such as molasses, and is generally heated and moistened by steam, the thus prepared and mixed flour product then being fed to a suitable press to form the pellets therefrom. The conventional apparatus for the production of such pellets thus comprises a feeding section to which the flour product is supplied, for instance by means of a hopper, a conditioning section for blending the flour product with additives and/or for heating and moistening the mixture, and a press section for pressing out the prepared flour product to form pellets, the conditioning section having an elongated cylindrical chamber with mixing and conveying means mounted rotatably therein and further having an inlet for the additives and/or a steam inlet. The conditioning section is connected at one end through an upwardly extending inlet duct to the feeding section located above it and is connected at the other end, through a downwardly extending outlet duct, to the press section located below it.

In such an apparatus, therefore, the feeding section, the conditioning section and the press section are located immediately one above the othet in the sequence mentioned, in order to achieve a continuous flow of flour product through the apparatus, until the finished product leaves the press section in the form of pellets. The conditioning section serves to impart to the flour product such a condition as will improve its pressing capacity. This is reflected on the one hand in the quality of the pellets, i.e., in the homogeneous distribution of the various types of flour and other additives such as fat and molasses, in the fracture resistance, and in the appearance and the form of the pellets. Furthermore, good pressing capacity also means that the mechanical parts of the press are subject to little wear and the power requirement of the motor is as small as possible. In the case of the production of mixed foods, the flour product which is fed to the apparatus may for example be composed of 10 or 12 different constituents, so that the processing of this mixture in the conditioning section has to be adapted to the particular composition involved. Conditioning generally and essentially takes place by steam injection into the conditioning chamber whereby heat and as a result of condensation also moisture are fed to the flour. In addition, other substances such as for example molasses can be injected. Together with the mechanical working of the flour product, this treatment results in a gelatinising of the starch and a plasticising of the albumen, and by virtue of the action of the heat, the fibrous parts and the oily substances of the flour product are softened and are made kneadable or viscous, while moreover the friction which occurs in the die apertures of the press, between the conditioned flour product and the walls of the apertures, is diminished. In order to achieve optimum effect, conditioning must take place directly above the press section so that the distance which the conditioned product has to travel before it reaches the die may be kep as short as possible to reduce heat losses to a minimum.

The output capacity of such a pressing apparatus is determined first and foremost by the output capacity of the conditioning section, i.e., the quantity of flour products which this section can process at maximum per unit of time and with good conditioning. In the case of the hitherto known apparatuses which have a single conditioning chamber with a mixing and conveying means located therein, this output capacity is generally lower than that of the feeding section and press section. An increasing of the capacity of the conditioning section by enlarging the diameter or the degree of charge thereof and/or by increasing the rate of axial throughput of the stream of flour through this chamber, is tied to definite limits, since if the chamber content is too great or if the degree of charge or rate of throuthput is too high, an homogeneous blending of the individual parts of the flour product will not be attainable and the action of the injected steam will be irregular or only incomplete.

SUMMARY OF THE INVENTION.

The object of the invention is to provide an apparatus of the above mentioned kind allowing a higher production rate together with a substantial improvement of the quality of the pellets obtained without, however, the dimensions of the apparatus having to be increased in consequence.

In the apparatus according to the invention, the conditioning section includes two separate parallel adjacently disposed identical conditioning chambers each with a mixing and conveying means, both conditioning chambers having an upwardly extending common inlet duct and a downwardly extending common outlet duct, which ducts are each located symmetrically of the vertical central longitudinal plane through the apparatus between the two conditioning chambers and which ducts are each directly connected to two closely adjacently disposed and obliquely relates inlet and outlet apertures, respectively, of the two conditioning chambers, the two mixing and conveying means being so driven in opposite directions that they rotate towards each other on the upper side of the conditioning chambers.

As a result, the flour product which is fed, through the single feeding section of conventional structure, to the conditioning section is evenly distributed over two conditioning chambers without the need to interpose a special distributing element, since a possible excessive supply of flour to one chamber results in a pressure rise at its inlet, so that a greater flow of flour passes through the opposite inlet aperture of the other chamber until the desired equalization of feed is attained. On the outlet side, both conditioning chambers pass the prepared flour product directly to the common outlet duct which leads directly to the press section therebelow.

Preferably, the diameter of each conditioning chamber is of the same order of magnitude as that of a single conditioning chamber of a comparable conventional apparatus. The two chambers are located closely adjacent each other between the feeding section and the press section, so that the apparatus is no higher than the conventional apparatus. The overall width of the two conditioning chambers need not be any greater than that of the press section, so that also in this respect the dimensions do not go beyond those of a conventional apparatus with a comparable press section. If moreover the length of the two conditioning chambers is chosen to be substantially the same as with a conventional apparatus with a single conditioning chamber, the rate of axial displacement of the product in the chambers will be approximately half as great and the dwell time of the product in the conditioning chambers will be twice as long, while naturally each conditioning chamber need process only half the total quantity of flour product supplied. Thus, a more effective blending is achieved, while the time available for the steam to act on the flour is substantially prolonged. By appropriately constructing the mixing and conveying means which may consist of the conventional impeller shafts, it is possible to drive these shafts at approximately the same rotary speed as in the case of the conventional apparatuses, so that by virtue of the lower rate of conveyance, the agitation of the product is greatly increased without the power requirement also increasing.

The additives which are to be admixed in the conditioning section, such as molasses, are naturally likewise evenly distributed as they are fed to the two conditioning chambers. This supply at two places to the two separate streams of flour product, will in itself provide an improved blending effect.

The measures indicated not only lead to a better conditioning of the product but they also allow to make full use of the output capacity of the press section.

BRIEF DESCRIPTION OF THE DRAWINGS.

The drawings show schematically an embodiment of the apparatus according to the invention.

PREFERRED EMBODIMENT OF THE INVENTION

Figure 1:
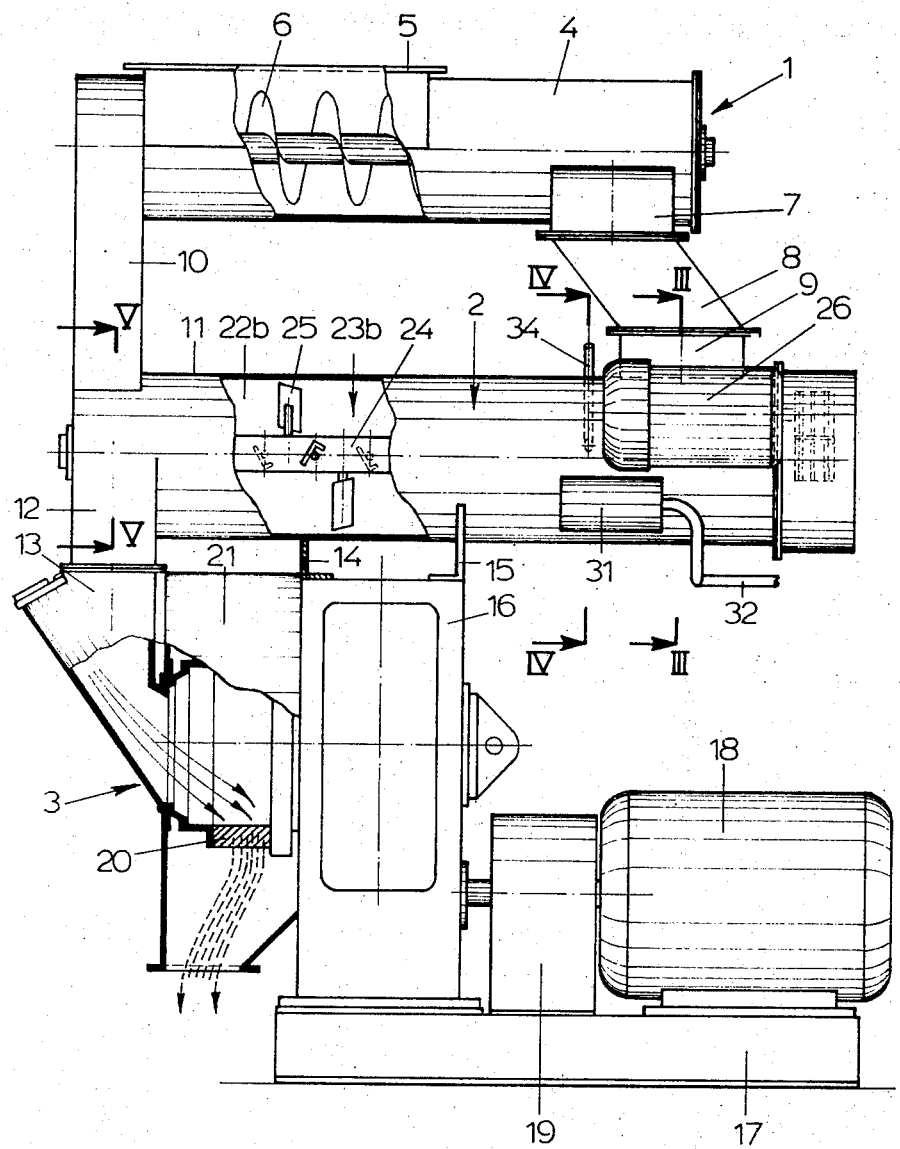
FIG. 1 is a side view of the apparatus with parts shown in section.
Figure 2:
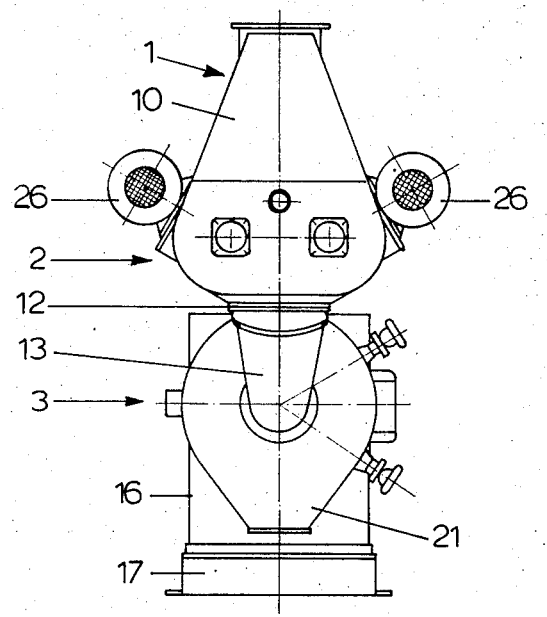
FIG. 2 is a front view of the apparatus shown in FIG. 1, viewed from the left-hand side of this drawing.

The apparatus for the production of food pellets as illustrated in the drawings comprises in the usual way three sections mounted one above the other, these being an upper feeding section 1, an intermediate conditioning section 2 and a lower press section 3. The feeding section 1 is of conventional design and consists of a horizontally extending elongated cylindrical housing 4 with an inlet aperture 5 on the upper side for connection to for example a flour storage container, there being mounted in this housing 4 a conveyor screw 6 which feeds the product in the direction to the right to an outlet 7 provided adjacent the right-hand end on the underside of the housing. This outlet 7 is connected through a short downwardly extending connecting pipe 8 to an inlet 9 of the conditioning section 2 located beneath it, the pipe 8 also serving for the support of the feeding section 1 on this side. At the other end, the feeding section 1 is supported by a box 10 in which the drive arrangement for the conveyor screw 6 is housed.

The conditioning section 2, to be described in further detail hereinbelow, comprises a horizontally extending elongated housing 11 which, at its end remote from the inlet connector 9, has on the underside an outlet connector 12 which is connected directly to the inlet 13 of the press section 3 located underneath. This housing 11 is furthermore, through two supporting angles 14 and 15, braced on a transmission gear case 16 of the press section 3.

The press section 3 is constructed in conventional manner and has a baseplate 17 on which the transmission gear case 16 and also an electric motor 18 are mounted, the electric motor 18 driving a press die 20 accomodated in a housing 21, the drive passing through a flexible coupling 19 and the gear transmission 16. By means of presser rollers located in the die, the conditioned flour product passing through the inlet 13 is formed by the die apertures into cylindrical pellets which are carried away through the open underside of the housing 21. The manner in which this press operates is known per se and is therefore not described in greater detail here.

Figure 3:
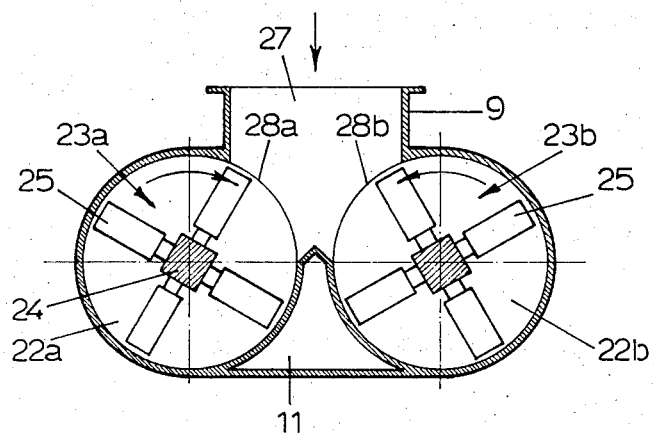
FIG. 3 is a section of the conditioning section of the apparatus as seen on the line III—III of FIG. 1.
Figure 4:
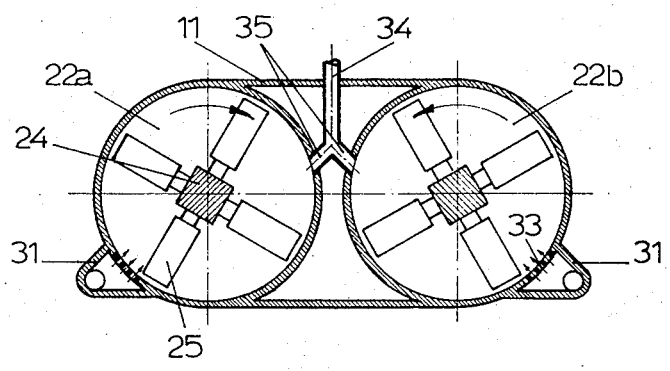
FIG. 4 is a similar section through FIG. 1 on the line IV—IV.
Figure 5:
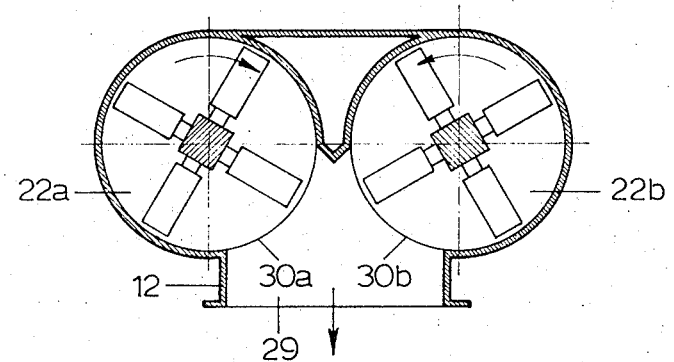
FIG. 5 is a similar section through FIG. 1 on the line V—V.

The housing 11 of the conditioning section 2 encloses two closely adjacently disposed parallel cylindrical conditioning chambers 22a and 22b which are completely separated from each other between the inlet 9 and the outlet 12 of the housing, and which each have substantially the same inside diameter as the single conditioning chamber of a comparable conventional apparatus of the present type. Housed in each chamber 22a and 22b is a mixing and conveying element 23a, 23b of conventional construction, each of these elements consisting of a shaft 24 with helically disposed blades 25, which shaft extends axially through the chamber and is rotatably mounted in the chamber end walls. These shafts 24 are driven in opposite directions of rotation by two electric motors 26 mounted on the outside of the housing 11 whereby, as the arrows in FIGS. 3 to 5 show, the blades 25 move towards each other on the upper side of the housing and away from each other on the underside. The angles of incidence of the blades are the same on both shafts 24, but they are opposed and may be adjustable.

On the inlet side, the inlet connector 9 of the housing 11 forms a common inlet duct 27 (FIG. 3) which is located symmetrically of the vertical central longitudinal plane through the apparatus and which leads directly to two inlet apertures 28a, 28b of the two chambers 22a, 22b, respectively. These two inlet apertures are located in the cylindrical chamber walls and meet each other on the aforesaid central longitudinal plane, the apertures thus being directed obliquely upwardly and towards each other. In a similar way, the outlet connector 12 arranged at the other end of the conditioning section 2 forms a common outlet duct 29 symmetrically of the central longitudinal plane of the apparatus, and two outlet apertures 30a and 30b of the two conditioning chambers 22a and 22b, respectively, discharge into this outlet duct. These outlet apertures in the cylindrical chamber walls again meet each other on the said central longitudinal plane and are directed obliquely downwardly and towards each other. As a result of this arrangement, the downwardly falling stream of flour emanating from the feeding section 1 is, in the inlet duct 28, evenly distributed into two equal partial streams which pass to the two chambers 23a, 23b, these partial streams converging again in the outlet duct 29 to fall downwards to the press section. Thus, a distributing member in the inlet duct 27 is superfluous, because if for example chamber 22a becomes more filled, then the pressure at the inlet aperture 28a of this chamber rises causing an increased stream of flour to flow to the inlet aperture 28b of the other chamber 22b.

Steam is blown into the chambers close to the inlet apertures 28a and 28b. For this purpose, at a low point of each chamber, a steam inlet box 31 is provided, which is connected on the one hand to a steam line 32 and on the other, through a number of narrow apertures 33 in the housing wall, to the chamber concerned (FIG. 4). Furthermore, directly downstream of the inlet apertures 28a and 28b, there is in the central longitudinal plane of the apparatus an inlet pipe 34 which forks into two lines 35 leading into both chambers, and through which molasses or some other liquid additive can be injected.

In the operation of the described apparatus, the conveyor screw 6 is driven, through the drive housed in the box 10, by an electric motor (not shown) and at a speed which can be regulated through a variable speed gear, for instance dependent upon the loading of the main pressing motor 18. The mixture of flour product supplied through the inlet 5 of the feeding section 1 passes from this section 1 through the chambers of the conditioning section 2 to the press section 3. The rotary speed of the impeller shafts 24 in the two conditioning chambers 22a, 22b is approximately equal to the conventional rotary speed of a comparable conventional apparatus with a single conditioning chamber and amounts for example to 500 r.p.m. However, by reducing the angle of incidence of the blades 25, the rate of axial displacement of material in the two conditioning chambers 22a and 22b is approximately halved, which at the same time results in intensified working of the mixture by the blades. By virtue of this reduced rate of conveyance of material in each of the chambers 22a, 22b and the reduced quantity of material passing through each of these chambers, the time available for the steam to act on the flour and for the admixture of molasses or other additives becomes of optimum duration. Thus, a substantially improved conditioning of the flour product is achieved, so that the press section 3 can operate at full capacity without the risk of excessive wear on the dies and an end product of the desired quality can be achieved.

It is possible to use steam injection when adding molasses through the inlet pipe 34, whereby the viscosity of the molasses is reduced and the blending of the flour is further improved. This means that in this case moisture and heat are fed into each chamber at two places.

Naturally, several changes of the aforedescribed example are possible within the scope of the invention, in pact particularly with respect to the diameter of the two conditioning chambers and the rate of conveyance in these chambers in relation to the quantity of flour product fed through the section 1 per unit of time.

What is claimed is:

1. An apparatus for the production of food pellets from a flour product, comprising a substantially horizontally extending feeding section adapted to receive the flour to be treated and having an outlet at its lower side adjacent one end, an elongated flour conditioning section extending substantially horizontally below said feeding section and including two separate parallel adjacently disposed identical conditioning chambers, each chamber having an inlet aperture at one end substantially below said feeding section outlet and each chamber having an outlet aperture adjacent its other end remote from said inlet aperture, means connecting said feeding section outlet to said two conditioning chamber inlet apertures and adapted to evenly distribute the flour flowing from said feeding section outlet over said two chamber inlet apertures, a mixing and conveying means rotatably mounted in each chamber for displacing the flour fed to the chamber from said inlet aperture to said outlet aperture thereof, means for feeding at least one fluid additive to said two conditioning chambers, a press section arranged directly below said conditioning section and having an inlet located substantially below said two conditioning chamber outlet apertures, and means connecting said latter two outlet apertures to said press section inlet.

2. The apparatus of claim 1 in which said two conditioning chamber inlet apertures are adjacently disposed facing obliquely upwardly and towards each other, said means connecting said feeding section outlet to said chamber inlet apertures comprising a common inlet duct extending upwardly from said two chamber inlet apertures and symmetrically arranged with respect to the vertical central longitudinal plane through the apparatus between the two conditioning chambers.

3. The apparatus of claim 2 in which said two conditioning chamber outlet apertures are adjacently disposed facing obliquely downwardly and towards one another, said means connecting said chamber outlet apertures to said press section inlet comprising a common outlet duct extending substantially downwardly from said two chamber outlet apertures and symmetrically arranged with respect to said vertical central longitudinal plane.

4. The apparatus of claim 1 further comprising drive means for said two mixing and conveying means in said two conditioning chambers, said drive means being adapted to drive said two mixing and conveying means in opposite rotational directions such that said two means rotate towards each other on the upper side of the conditioning chambers.

5. The apparatus of claim 1 in which said fluid additive feeding means comprises a common inlet pipe forking symmetrically towards said two conditioning chambers and adapted to supply a liquid additive to said chambers.

6. The apparatus of claim 1 in which said fluid additive feeding means further comprises means for feeding steam to each of said conditioning chambers.

7. An apparatus for the production of food pellets from a flour product, comprising an elongated flour conditioning section having two ends and including two separate parallel adjacently and substantially horizontally disposed identical conditioning chambers, each chamber having an inlet aperture adjacent one of said sections ends and an outlet aperture adjacent the opposite of said two section ends, said two inlet apertures to said two chambers being adjacently disposed and facing obliquely upwardly and towards each other and said two outlet apertures of said two chambers being likewise adjacently disposed and facing obliquely downwardly and towards each other, a common inlet duct connected to said two inlet apertures and extending upwardly therefrom, a common outlet duct connected to said two outlet apertures and extending downwardly therefrom, two mixing and conveying elements one mounted for rotation in each conditioning chamber for working and conveying the flour product fed to said chamber from said inlet duct to said outlet duct, drive means for said two mixing and conveying elements adapted for driving the latter in such opposite rotational directions that said elements rotate towards each other on the upper side of the conditioning chambers, means connected to said chambers for feeding a liquid additive to the flour product passing through said chambers, means for injecting steam into said chambers, feeding means arranged above said conditioning section and connected to said inlet duct for feeding the flour product to be treated to said chambers, and a press section for pressing pellets from the conditioned flour product discharged by said conditioning section, said press section having an inlet arranged immediately below and connected to said outlet duct.

* * * * *

UNITED STATES PATENT OFFICE
CERTIFICATE OF CORRECTION

Patent No. 3,828,661　　　　　　　Dated August 13, 1974

Inventor(s) Johannes Albertus Vink

It is certified that error appears in the above-identified patent and that said Letters Patent are hereby corrected as shown below:

IN THE SPECIFICATION

Column 1, line 31, "othet" should be --other--.

Column 1, line 67, "kep" should be --kept--.

Column 2, line 15, "throuthput" should be --throughput--.

Column 5, line 52, "pact" should be --fact--.

IN THE CLAIMS

Column 6, line 56, "to" should be --of--.

Signed and sealed this 29th day of October 1974.

(SEAL)
Attest:

McCOY M. GIBSON JR.　　　　　　　C. MARSHALL DANN
Attesting Officer　　　　　　　　Commissioner of Patents